US008643766B2

(12) United States Patent
Takano et al.

(10) Patent No.: US 8,643,766 B2
(45) Date of Patent: Feb. 4, 2014

(54) AUTOFOCUS SYSTEM EQUIPPED WITH A FACE RECOGNITION AND TRACKING FUNCTION

(75) Inventors: Yoshijiro Takano, Saitama (JP); Kunio Yata, Saitama (JP)

(73) Assignee: Fujifilm Corporation, Tokyo (JP)

( * ) Notice: Subject to any disclaimer, the term of this patent is extended or adjusted under 35 U.S.C. 154(b) by 433 days.

(21) Appl. No.: 12/946,370

(22) Filed: Nov. 15, 2010

(65) Prior Publication Data

US 2011/0115945 A1    May 19, 2011

(30) Foreign Application Priority Data

Nov. 17, 2009  (JP) .................................. 2009-262049

(51) Int. Cl.
  *H04N 5/232*    (2006.01)
(52) U.S. Cl.
  USPC ..................................... 348/345; 348/208.14
(58) Field of Classification Search
  USPC ............................................. 348/349, 208.14
  See application file for complete search history.

(56) References Cited

U.S. PATENT DOCUMENTS

| 7,561,790 | B2 | 7/2009 | Yata |
| 2006/0204058 | A1* | 9/2006 | Kim et al. ...................... 382/118 |
| 2008/0080739 | A1 | 4/2008 | Muramatsu |
| 2008/0181460 | A1 | 7/2008 | Tamaru |
| 2008/0284900 | A1 | 11/2008 | Abe |
| 2009/0238549 | A1* | 9/2009 | Kanayama ...................... 396/95 |
| 2010/0254689 | A1* | 10/2010 | Yata ................................ 396/95 |
| 2011/0019066 | A1* | 1/2011 | Takano et al. ................. 348/345 |

FOREIGN PATENT DOCUMENTS

| EP | 1909229 | 4/2008 |
| EP | 2104338 | 9/2009 |
| JP | 8-334674 | 12/1996 |
| JP | 2006-267221 | 10/2006 |
| JP | 2008-270896 | 11/2008 |
| JP | 2008-271310 | 11/2008 |
| JP | 2008-276214 | 11/2008 |
| WO | WO2007/024351 | 3/2007 |

OTHER PUBLICATIONS

Extended European Search Report dated Mar. 15, 2011, for the corresponding European Application No. EP 1019 1301.
Japanese Official Action—2009-262049—Jun. 20, 2013.

* cited by examiner

*Primary Examiner* — Gary C Vieaux
(74) *Attorney, Agent, or Firm* — Young & Thompson

(57) ABSTRACT

An autofocus system which can prevent erroneous tracking of an unintended tracking target, is provided. In a recognition and tracking mode which uses an AF frame to automatically track a face of a specific person for which certification data is previously stored, a face of a specific person designated by an operator is detected by face authentication processing from a captured image obtained from a television camera. Thereafter, the face is detected from the captured image by a pattern matching processing in which an image of the face is used as a reference pattern for object tracking processing, and the AF frame is moved to the detected position. The face recognition processing is executed each time when the object tracking processing is executed a predetermined times, thereby preventing erroneous tracking by the object tracking processing.

3 Claims, 11 Drawing Sheets

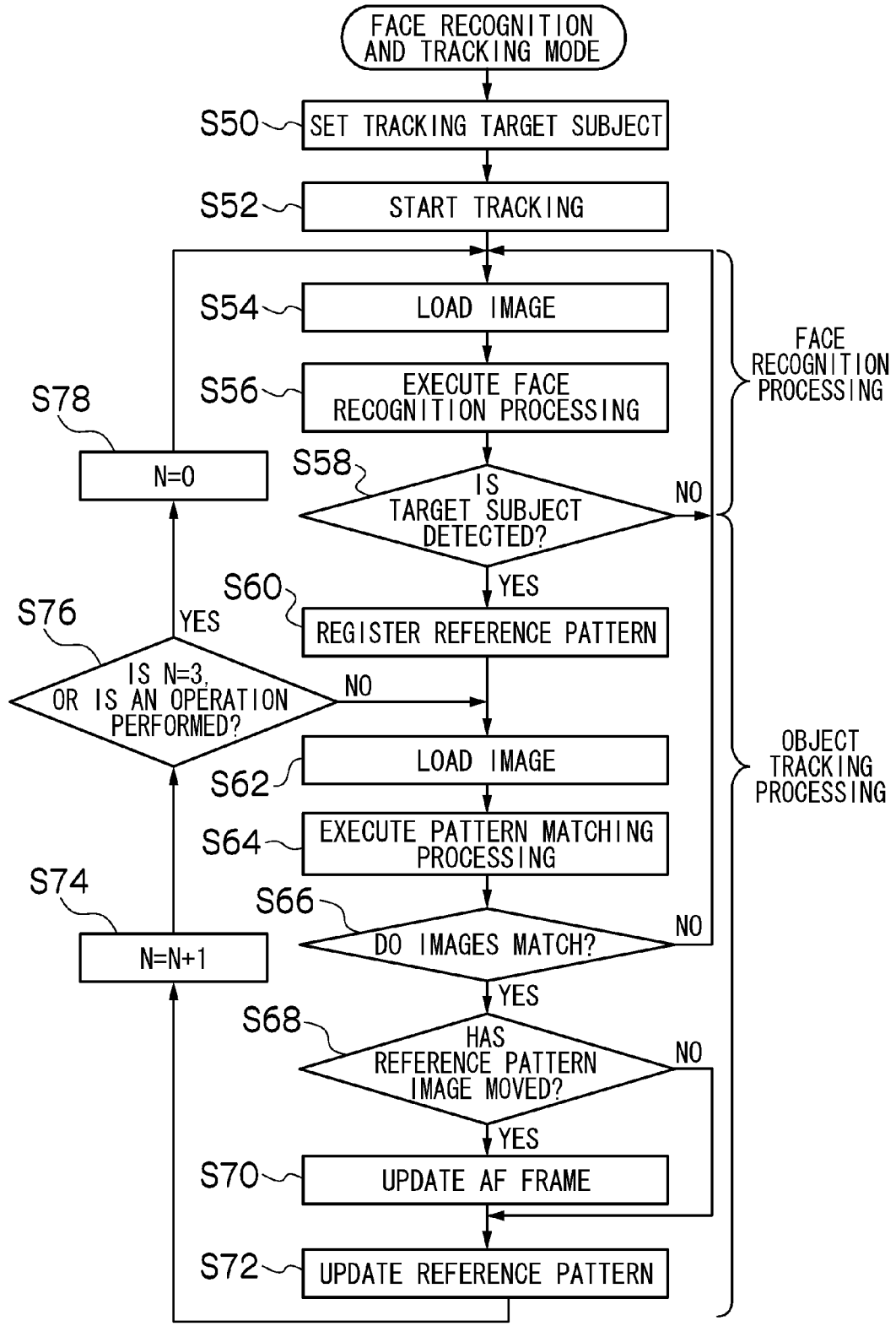

CONVENTIONAL EXAMPLE

THIS EMBODIMENT

AUTOFOCUS SYSTEM EQUIPPED WITH A FACE RECOGNITION AND TRACKING FUNCTION

BACKGROUND OF THE INVENTION

1. Field of the Invention

The presently disclosed subject matter relates to an autofocus system, and more particularly to an autofocus system equipped with a face recognition and tracking function that causes an AF frame (AF area) that represents the range of a subject brought into focus by autofocus (AF) to track the face of a person that is registered beforehand.

2. Description of the Related Art

A well known television camera system for broadcasting or business use includes an autofocus function that automatically focuses on a desired subject. This type of camera system generally uses a contrast-type AF system. In the contrast-type AF system, the camera system detects the level of contrast in a captured video image, and controls the focus of an imaging optical system such that the contrast becomes the maximum (local maximum).

Normally, a target range of a subject that is brought into focus by AF is not an area of the entire screen of a captured video image, but rather is limited to a particular range that is referred to as an "AF area". The subject inside the AF area is brought into focus by controlling the focus such that the contrast of the captured image (subject image) inside the AF area becomes the maximum. According to the present specification, a frame that shows an outline of the AF area is referred to as an "AF frame".

Japanese Patent Application Laid-Open No. 8-334674 and Japanese Patent Application Laid-Open No. 2006-267221 disclose autofocus systems that have an AF frame auto-tracking function that allows the AF frame to automatically track a desired subject that moves inside the image area of a captured video image so that the subject is continuously in focus. The AF frame auto-tracking is performed by detecting the tracking target subject (subject image) in the captured image and moving the AF frame to the detected position. As a method for detecting an image of a tracking target subject from a captured image, Japanese Patent Application Laid-Open No. 8-334674 discloses a method of storing the image of the tracking target subject as a reference pattern and detecting an image that matches the reference pattern from the captured image using a pattern matching processing. Japanese Patent Application Laid-Open No. 2006-267221 discloses a method that detects a subject that moved by determining a difference (difference image) between two captured images that are acquired in succession which are captured images sequentially obtained from a video signal.

Known kinds of AF frame auto-tracking according to types of tracking target subject include: object tracking in which an arbitrary object can be used as the tracking target subject; face detection and tracking in which only a face of a person (or animal of the like) is used as the tracking target subject; and face recognition and tracking in which only a face of a specific person (or animal or the like (omitted hereunder)) is used as the tracking target subject.

The face detection and tracking detects faces of arbitrary people from a captured image by face detection processing and uses one of the detected faces as a tracking target. The face recognition and tracking detects a face of a specific person that has been previously registered from a captured image by face recognition processing, and uses the thus-detected face of the specific person as the tracking target subject.

SUMMARY OF THE INVENTION

When performing face recognition and tracking, a case may be considered in which, while successively detecting the face of a specific person as the face to be tracked using face recognition processing, the AF frame is moved to the detected position. However, because the face recognition processing requires complex processing that searches for a face that matches certification data which shows features of a face of a person to be detected from a captured image, a long time is taken for the processing and it is difficult to track a face that moves in the image area without a delay. Therefore, conventionally in the case of face recognition and tracking, the face recognition processing is executed once when starting tracking, and after detecting the face of the specific person as the tracking target, the detected face is tracked using an object tracking processing. For example, an image pattern of the face detected by the face recognition processing is stored as a reference pattern, and thereafter the face of the specific person is tracked by detecting an image range that matches the reference pattern from a captured image by pattern matching processing and moving the AF frame to the detection position.

However, when face recognition processing is performed only once at the start of AF frame auto-tracking to detect the face of the specific person as the tracking target, as in the case of the above-described face recognition and tracking, if the face that is the tracking target is mistakenly changed to another face or the like by object tracking thereafter, that fact can not be automatically detected. In that case, it is necessary for the operator to stop the AF frame auto-tracking processing, and execute the processing again starting from the face recognition processing. Consequently, there is the problem that it requires time and labor for the operation to correct the mistaken tracking. Furthermore, when the operator wants to change the face to be tracked to a face of another person, it is also necessary for the operator to stop the AF frame auto-tracking processing once, change the face to be the tracking target, and resume the AF frame auto-tracking processing. There is thus the problem that this operation also requires time and labor.

The presently disclosed subject matter has been made in view of the above-described circumstances, and aims to provide an autofocus system which is equipped with a face recognition and tracking function which can prevent erroneous tracking of an unintended tracking target by object tracking when performing face recognition and tracking in which a face of a specific person detected by face recognition processing is tracked with an AF frame using an object tracking processing.

In order to achieve the above-described object, an autofocus system according to a first aspect of the presently disclosed subject matter includes: an autofocus device which controls focusing of an imaging optical system that forms a subject image on an imaging device so as to bring into focus a subject inside a range corresponding to an AF frame in a range of the subject that is imaged by the imaging device; a face recognition processing device which uses certification data showing features of a face of a specific person that is previously stored to detect an image of the face of the specific person in a captured image obtained by the imaging device; an object tracking device which sequentially detects a range of an image that matches an image of an arbitrary object within captured images that are sequentially obtained by the imaging device, and tracks the image of the object by means of an AF frame by setting the range as a range of the AF frame; and a face recognition and tracking device which, after the range of the image of the face of the specific person which is detected by the face recognition processing device is set as the range of the AF frame, updates the range of the AF frame which is set by the face recognition processing device, at predetermined time intervals while the object tracking device tracks, with the AF frame, an image in the set range of the AF frame as the image of the arbitrary object.

An autofocus system according to a second aspect of the presently disclosed subject matter, the autofocus system according to the first aspect, further includes an operation section which includes a display device for displaying captured images sequentially obtained by the imaging device, and a user input operation device which detects a user operation, wherein while the face recognition and tracking device is tracking the image of the face of the specific person with the AF frame, if it is detected by the face recognition processing device that a face of another person that is different from the specific person is designated on the operation section, the face recognition and tracking device sets the designated image of the face of the another person as the image to be detected by the face recognition processing device, and tracks the designated image of the face of the another person with the AF frame.

According to the presently disclosed subject matter, since detection of a face of a specific person to be tracked (tracking target), is performed by a face recognition processing device even when the face of a specific person that has been detected by the face recognition processing device is tracked by an object tracking device, a failure whereby an incorrect tracking target is erroneously tracked is prevented. Further, since detection of the face of the specific person is repeatedly performed by the face recognition processing device, a tracking target can be easily changed. Furthermore, by making it possible to change the person being the tracking target by performing a designation operation (for example, tap operation) on a screen as in the second aspect, the tracking target subject can be changed more quickly and easily.

According to the presently disclosed subject matter, when performing face recognition and tracking that tracks a face of a specific person detected by face recognition processing with an AF frame using object tracking, it is possible to prevent the erroneous tracking of an unintended tracking target by object tracking.

BRIEF DESCRIPTION OF THE DRAWINGS

FIG. 10 is a flowchart illustrating a processing procedure of the face recognition and tracking mode.

DETAILED DESCRIPTION OF THE PREFERRED EMBODIMENTS

An autofocus system according to the presently disclosed subject matter is described in detail hereunder with reference to the accompanying drawings.

Figure 1:
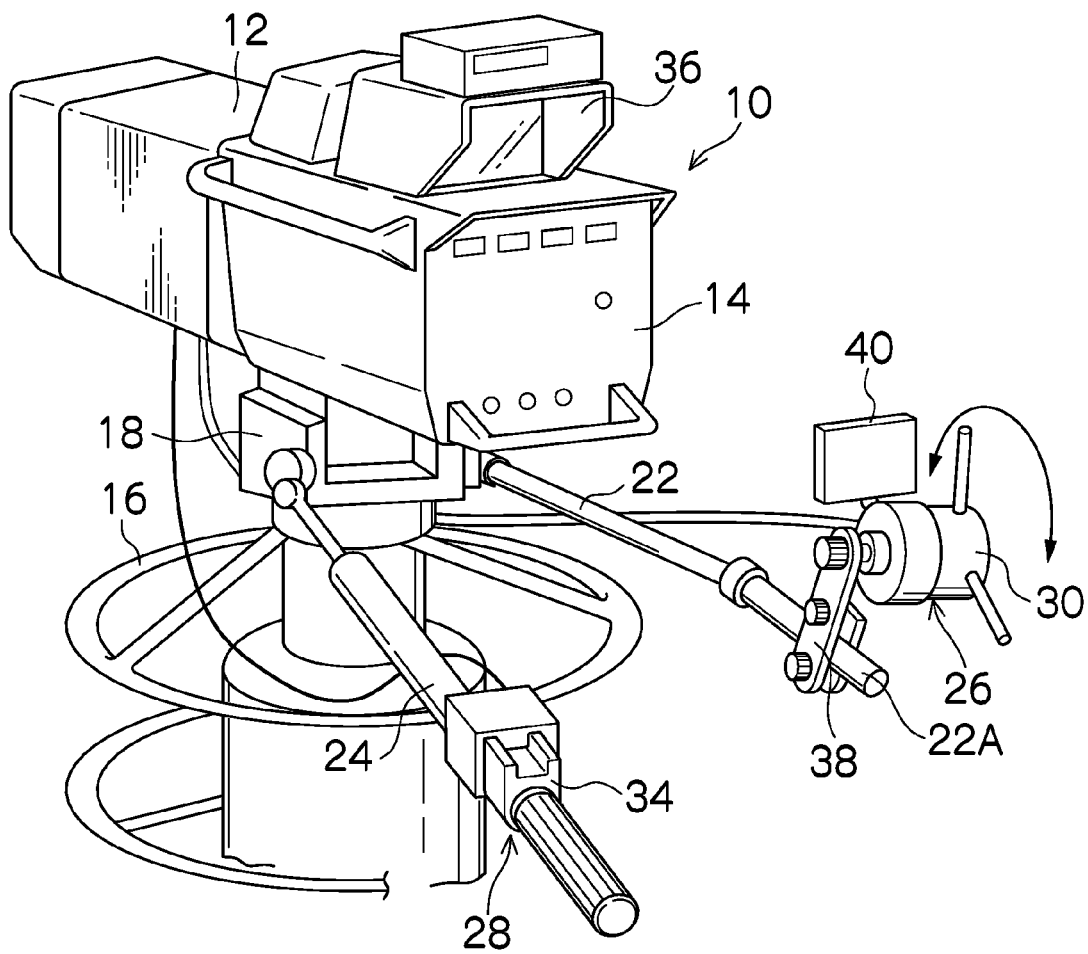
FIG. 1 is an external view that illustrates an embodiment of a television camera system to which the presently disclosed subject matter is applied.

FIG. 1 is an external view that illustrates an embodiment of a television camera system to which the presently disclosed subject matter is applied. As shown in FIG. 1, a television camera 10 is a camera that is mainly used for broadcasting or business purposes, and includes a lens device 12 and a camera main body 14. The television camera 10 is supported on a pan head 18 that is installed on a pedestal dolly 16.

Two left and right pan rods 22 and 24 are provided to extend from the pan head 18. A focus demand (focus controller) 26 is installed by means of a mounting clamp 38 on a grip part 22A of the right pan rod 22, and a zoom demand (zoom controller) 28 is installed on a grip part of the left pan rod 24.

The focus demand 26 is provided with a rotatable focus knob 30. When the focus knob 30 is turned when performing focus control by manual focus (MF), a focus control signal which instructs the lens device 12 to move the focus (focus lens) to a focus position corresponding to the rotation position as a target position is sent from the focus demand 26 to the lens device 12. In response to the signal, the focus lens of the lens device 12 moves to the target position designated by the focus control signal.

The zoom demand 28 is provided with a rotatable thumb ring 34. When the thumb ring 34 is rotated in the left or right direction, a zoom control signal which instructs the lens device to move a zoom (zoom lens) at a zoom speed corresponding to the rotated position as a target speed is sent from the zoom demand 28 to the lens device 12. In response to the signal, a zoom lens of the lens device 12 moves at the target speed designated by the zoom control signal.

Although omitted from the drawings, the focus demand 26 is provided with various operation members relating to autofocus (AF), and is equipped with an AF frame control device (AF frame auto-tracking device) for performing control (change of position and the like) of the AF frame that represents the target subject range (target range of the AF) that is brought into focus by the AF. In addition, various operation members of the AF frame control device are also provided on the focus demand 26.

Additionally, as shown in the drawing, a liquid crystal display (LCD) equipped with a touch panel 40 as a component of the AF frame control device is provided on the upper part of the main body of the focus demand 26 by means of an installation tool, and is connected to the focus demand 26 using an unshown cable.

In this connection, the term "LCD 40" as used hereunder refers to the liquid crystal display 40 equipped with a touch panel 40. The LCD 40 can also be provided at an arbitrary position other than the upper part of the main body of the focus demand 26. For example, the LCD 40 may be provided at a side of a view finder 36.

A view finder 36 that is a display device is provided on the camera main body 14. Since a video image of a subject that is being taken by the television camera 10 is displayed on the view finder 36, the cameraman can take an image of the subject with a desired composition by operating the focus demand 26 and the zoom demand 28 while viewing the video image. In this connection, the terms "captured video image" or "captured image" as used hereunder refer to a video image or image that is currently being taken with the television camera 10.

An image of the AF frame that shows a position, a size, and a shape (aspect ratio) to which the AF frame is currently set is superimposed on the captured video image that is displayed on the view finder 36. Thus, when performing focus control based on AF, it is possible for the operator to know a range of the subject in the captured video image is being brought into focus. The MF and AF focus controls can be changed using a mode switch or the like provided on the focus demand 26.

Figure 2:
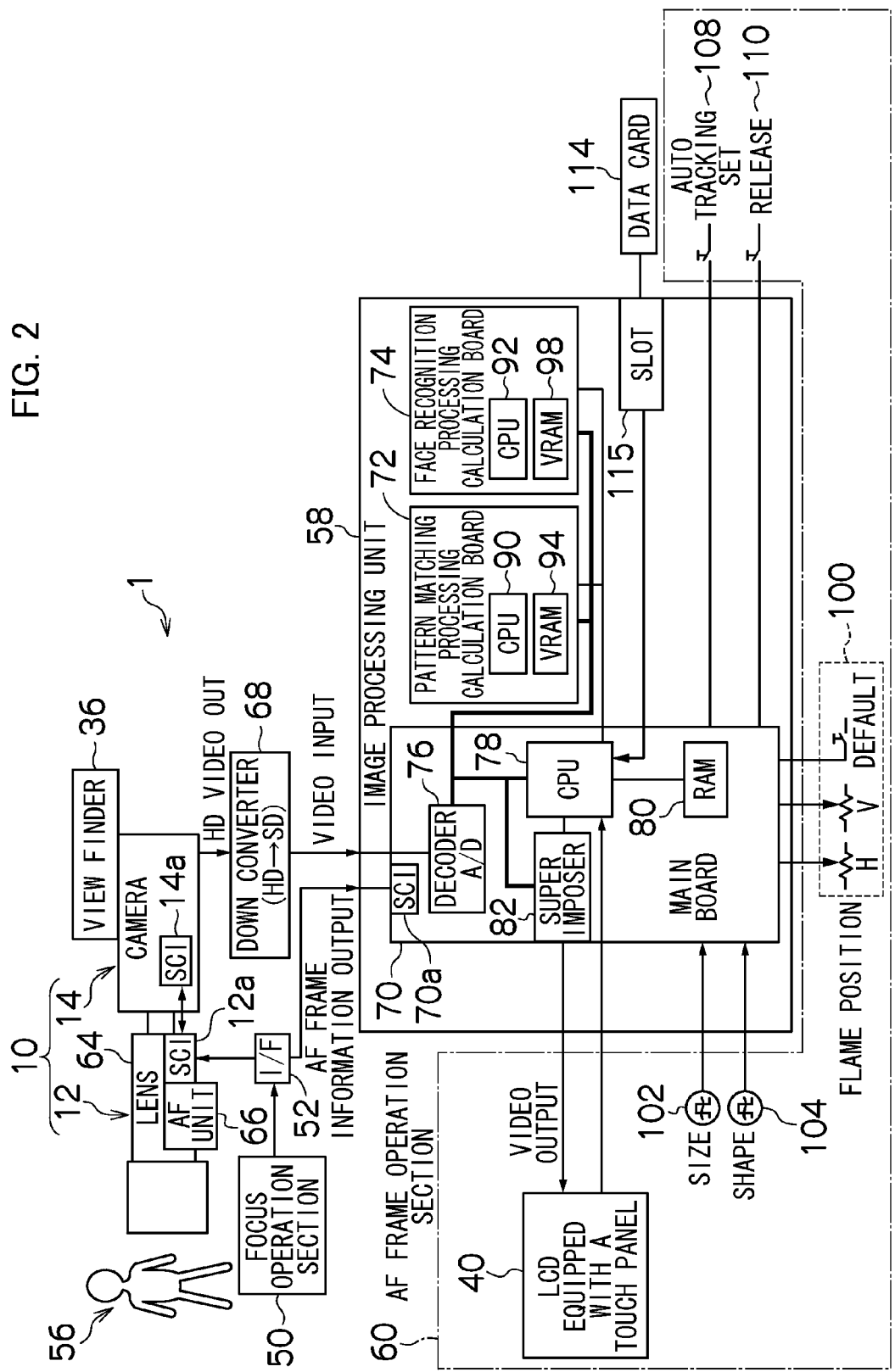
FIG. 2 is a block diagram that illustrates the overall configuration of an AF frame auto-tracking system that is applied to the television camera system shown in FIG. 1.

FIG. 2 is a block diagram that illustrates the overall configuration of an AF frame auto-tracking system that is applied to the above-described television camera system.

The lens device 12, the camera main body 14, and the view finder 36 of the television camera 10 shown in FIG. 1 are shown in an AF frame auto-tracking system 1 shown in FIG. 2. FIG. 2 also shows, as components of the focus demand 26 shown in FIG. 1, a focus operation section 50, and an image processing unit 58 and an AF frame operation section 60 which constitute the AF frame control device (AF frame auto-tracking device) mounted on the focus demand 26.

The television camera 10 includes the camera main body 14 that comprises a HD camera corresponding to a high-definition television [HDTV] system, and the lens device 12 that has an image-taking lens (optical system) mounted to a lens mount of the camera main body 14.

An imaging element (for example, a CCD) and necessary signal processing circuits and the like are mounted in the camera main body 14. After an image formed by the image-taking lens of the lens device 12 is photoelectrically converted by an imaging element, necessary signal processing is performed by the signal processing circuits, and the image is output to external devices as a video signal according to the HDTV system (HDTV signal) from a video signal output terminal or the like of the camera main body 14.

As shown in FIG. 1, the view finder 36 provided on the upper part of the camera main body 14 displays the captured video image by the television camera 10. The view finder 36 is also configured to display various kinds of information as well as the captured video image. For example, an image indicating the position, size, and shape of the currently set AF frame is superimposed on the captured video image.

The lens device 12 includes an image-taking lens (zoom lens) 64 that is mounted on the lens mount of the camera main body 14. The image-taking lens 64 forms an image of a subject 56 on the imaging surface of the imaging element of the camera main body 14. Although omitted from the drawings, the image-taking lens 64 is provided with movable sections for adjusting image-taking conditions of a focus lens group, a zoom lens group, and an aperture as components thereof. These movable sections are electrically driven by a motor (a servomechanism). For example, the focus lens group is moved in the optical axis direction to adjust the focus (subject distance), and the zoom lens group is moved in the optical axis direction to adjust the focal distance (zoom magnification).

In this connection, in the system relating to the AF, it is sufficient that at least the focus lens group is electrically driven, and the other movable sections may be driven manually.

The lens device 12 further includes an AF unit 66 and an unshown lens CPU. The lens CPU performs unified control of the entire lens device 12. The AF unit 66 is a processing section for acquiring information required to perform focus control (autofocus adjustment) based on the AF, and includes an AF processing section (not shown) and an AF imaging circuit (not shown).

The AF imaging circuit is disposed in the lens device 12 in order to acquire video signals for AF processing, and includes an imaging element (referred to as an "AF imaging element"), such as a CCD (Charge Coupled Device), and a processing circuit that outputs a signal from the AF imaging element as a video signal of a predetermined format. The video signal output from the AF imaging circuit is a brightness signal.

Subject light which is branched from subject light incident on the imaging element of the camera main body 14 by a half mirror or the like disposed on the optical path of the image-taking lens 64 is focused on the imaging surface of the AF imaging element. The imaging-taking range and the subject distance (distance to the subject in focus) with respect to the imaging area of the AF imaging element are configured to match the imaging-taking range and the subject distance with respect to the imaging area of the imaging element of the camera main body 14. In addition, the subject image captured by the AF imaging element matches the subject image captured by the imaging element of the camera main body 14. The two imaging-taking ranges do not need to be completely matching. For example, the image-taking range of the AF imaging element may be a large range that includes the image-taking range of the imaging element of the camera main body 14.

The AF processing section acquires a video signal from the AF imaging circuit, and determines a focus evaluation value representing a level of contrast of the subject image within the AF area (the AF frame) as the AF target range on the basis of the video signal. For example, high-frequency component signals are extracted by a high pass filter from the video signals acquired from the AF imaging element, and thereafter, among the high-frequency component signals, signals in a range corresponding to the AF area which is set as described later are integrated for each single screen (single frame). The integrated value acquired for each screen in this manner indicates the level of the contrast of the subject image within the AF area, and the integrated value is sent as a focus evaluation value to the lens CPU.

The lens CPU acquires the information of the AF frame (AF frame information) indicating the range (outline) of the AF area from the image processing unit 58 as described later, and designates the range within the AF frame that is designated by the AF frame information to the AF processing section as the AF area. The lens CPU then acquires the focus evaluation value determined for the image (video signal) in the AF area from the AF processing section.

Thus, whenever video signals corresponding to one screen are acquired from the AF imaging circuit (whenever the AF processing section determines the focus evaluation value), the lens CPU acquires the focus evaluation value from the AF processing section, and controls the focus lens group such that the acquired focus evaluation value is the maximum (local maximum), that is, the contrast of the subject image within the AF frame is the maximum. For example, a hill-climbing method is generally known as a method of controlling a focus lens group on the basis of a focus evaluation value. In the hill-climbing method, the focus lens group is moved in a direction in which the focus evaluation value increases, and when a point is detected at which the focus evaluation value starts to decrease, the focus lens group is set to that position. In this way, the subject within the AF frame is automatically brought into focus.

The above-described AF processing section acquires the video signal from the AF imaging element mounted in the lens device 12 in order to calculate the focus evaluation value. However, a configuration may also be adopted in which the video signal of the image captured by the imaging element of the camera main body 14 is acquired from the camera main body 14. In addition, any kind of AF device may be used as the AF device for automatically focusing on the subject within the AF frame.

Figure 3:
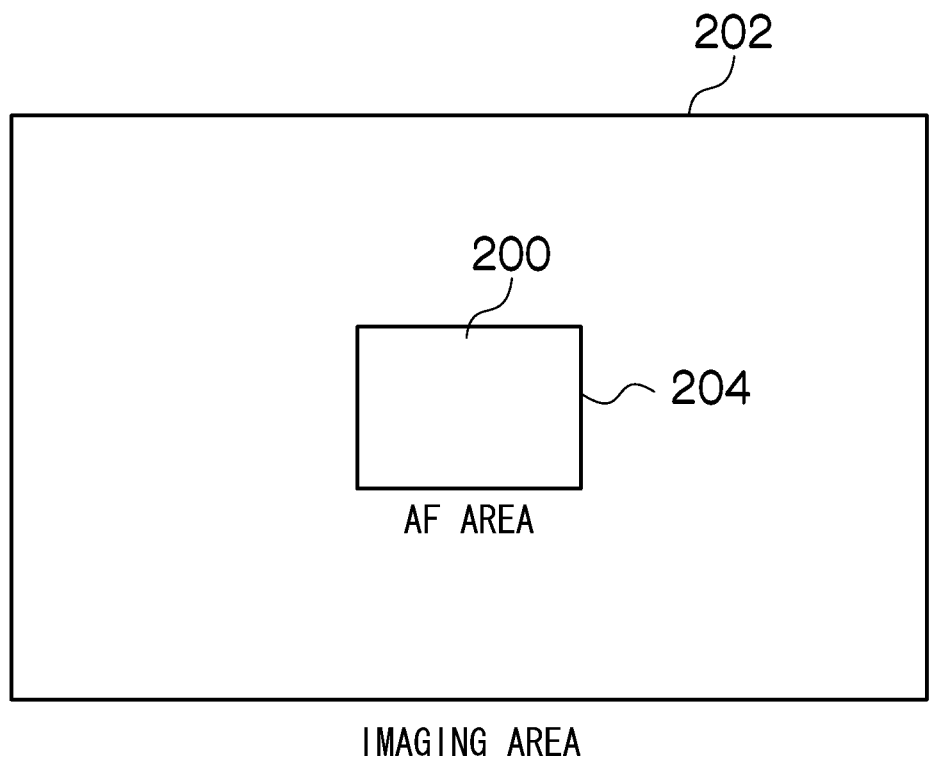
FIG. 3 is an explanatory view of an AF frame (AF area)

In this case, as shown in FIG. 3, an AF area 200 is set as a tetragonal region for an imaging area 202 of the imaging element in the camera main body 14. A frame 204 indicating an outline of the tetragonal region representing the AF frame. The subject which is imaged in the range of the AF area 200 (within the AF frame 204) of the imaging element is the target to be focused on by the AF.

According to the present specification, the range of the AF frame 204 (AF area 200) relative to the imaging area 202 is determined by three factors, namely, the position, size, and shape (aspect ratio) of the AF frame 204. Further, in the present specification, a description to the effect of "changing the range of the AF frame" means changing at least one factor among the three factors of the position, size, and shape of the AF frame.

The lens device 12 is connected directly or through a cable to the camera main body 14. The lens device 12 and the camera main body 14 can exchange various information through serial communication interfaces (SCI) 12a and 14a provided in the lens device 12 and the camera main body 14, respectively. With such a configuration, the AF frame information which is currently set in the AF unit 66 is also transmitted to the camera main body 14, and an AF frame image corresponding to the position, size, and shape of the AF frame which is currently set is superimposed on the captured video image displayed on the view finder 36 by processing inside the camera main body 14.

The focus operation section 50 is a component of the focus demand 26, and is a component included in a general focus demand. The components of the focus operation section 50 include the focus knob 30 shown in FIG. 1, operation members relating to AF control and MF control such as a mode switch (not shown in the drawings) for switching between the AF mode and the MF mode or switching the AF mode type (continuous mode or momentary mode) and an AF start switch (not shown in the drawings) for designating the start of the AF, and a processing circuit for detecting a setting state of the operation members and transmitting a control signal based on the detected setting state.

The focus demand 26 is provided with an interface (I/F) 52 for connecting with the lens device 12 through a cable. The focus operation section 50 is connected to the lens device 12 through the I/F 52 and the cable, and is configured to exchange various signals with the lens CPU through the SCI 12a (Serial Communication Interface) by serial communication.

Thus, various control signals transmitted from the focus operation section 50 are sent to the lens CPU, and processes based on the control signals are executed by the lens CPU. For example, when the operator enters an instruction to perform focus control based on AF (AF mode), focus control according to AF is performed on the basis of the focus evaluation value which is obtained from the AF unit 66 as described above. When the operator enters an instruction to perform focus control based on MF (MF mode), focus control based on MF is performed in accordance with a focus position command signal which is transmitted from the focus operation section 50 based on operation of the focus knob 30.

The image processing unit 58 is a processing section mounted to the focus demand 26 as a component of the AF frame control device, and is a processing section for specifying the range (position, size, and shape (aspect ratio)) of the AF frame set in the AF unit 66 of the lens device 12 by an AF frame auto-tracking process or a manual operation that is described later.

The image processing unit 58 includes an SCI 70. The SCI 70 is connected to the lens device 12 through the I/F 52, and is configured to exchange various signals with the lens CPU through the SCI 12a. With such a configuration, the AF frame information specifying the range of the AF frame is transmitted from the image processing unit 58 to the lens CPU of the lens device 12, and the range of the AF frame in the AF unit 66 is set on the basis of the AF frame information.

Further, in the focus demand 26, the image processing unit 58 is provided with a video input connector for receiving a video signal, and a video output connector of the camera main body 14 is connected by a cable to the video input connector through a down converter 68. As a result, the HDTV signal output from the video output connector of the camera main body 14 is converted (subjected to down conversion) by the down converter 68 into a video signal (an SDTV (Standard Definition Television) signal) of a standard TV [NTSC (National Television System Committee)] system, and the converted video signal is input to the image processing unit 58.

As described in detail later, when executing the AF frame auto-tracking process, the image processing unit 58 sequentially loads captured images for each single screen from the video signal input from the camera main body 14, and performs a process for detecting a predetermined tracking target subject (a subject to be tracked) from inside t he captured images. Next, the image processing unit 58 determines the range of the AF frame so as to bring the subject into focus by AF, and transmits the determined AF frame range to the lens CPU of the lens device 12.

The configuration and the processing contents of the image processing unit 58 will be described later.

The AF frame operation section 60 as the AF frame control device is provided integrally with the image processing unit 58 in the focus demand 26, or a part or all thereof is provided in a separate device to the focus demand 26, that is, a device separated from the image processing unit 58, and is connected thereto through a cable or the like. According to the present embodiment, as shown in FIG. 1, the LCD equipped with a touch panel 40 is provided separately from the focus demand 26 (image processing unit 58), and the other components are provided together with the image processing unit 58 in the focus demand 26.

The AF frame operation section 60 is an operation section for mainly performing operations relating to control of the AF frame, and includes an operation member for allowing an operator to manually specify the range of the AF frame and an operation member for performing an operation relating to AF frame auto-tracking to cause the AF frame to automatically track a desired subject.

Figure 4:
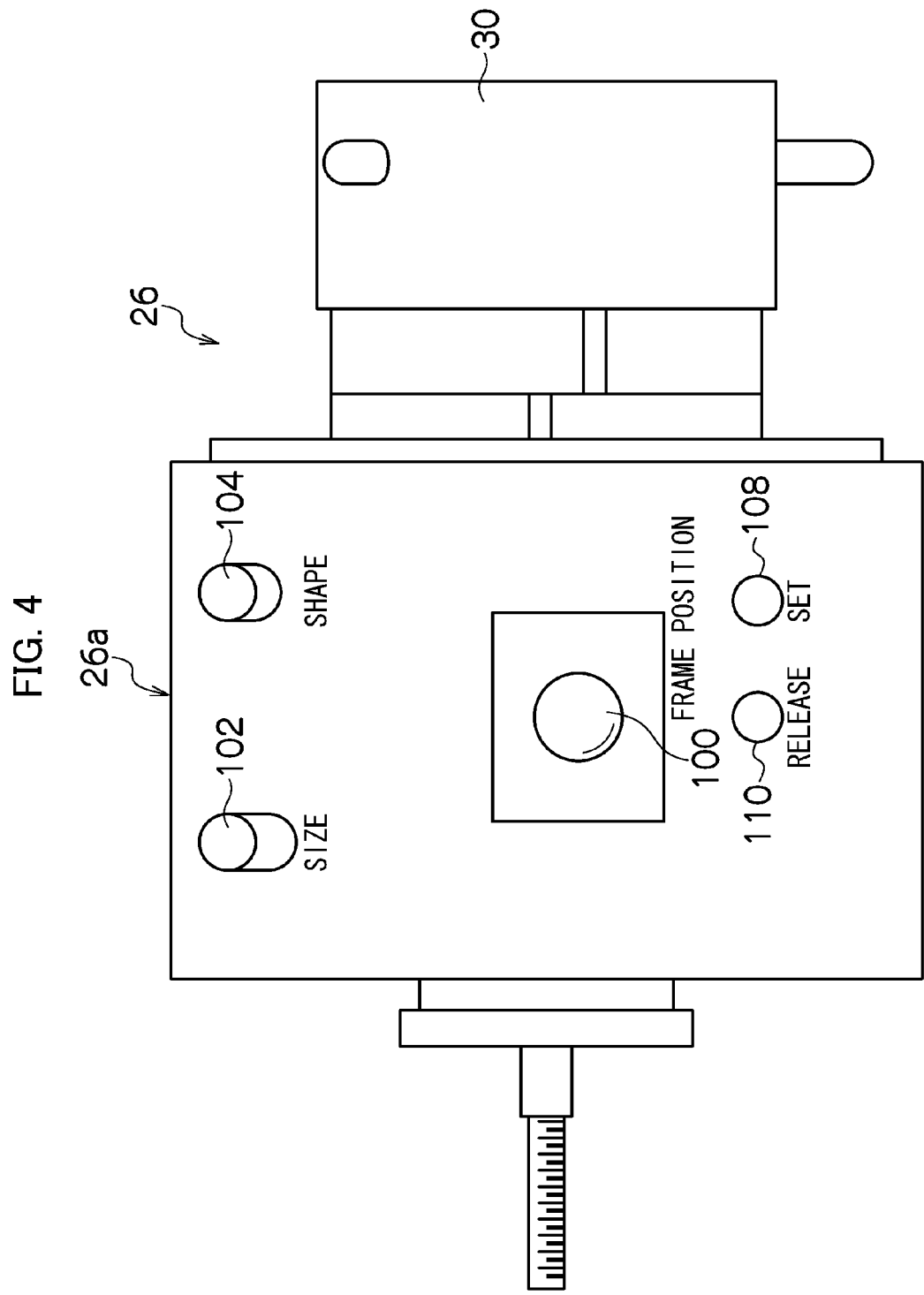
FIG. 4 is an external view of a focus demand.

As shown in the external view of the focus demand 26 in FIG. 4, as operation members of the AF frame operation section 60, the focus demand 26 is provided with: a position operation member 100 (for example, a joy stick or a track ball) for vertically and horizontally moving the position of the AF frame by a manual operation of a user; a size operation member 102 (for example, a knob) for changing the size of the AF frame by a manual operation; a shape operation member 104 (for example, a knob) for changing the shape of the AF frame by a manual operation; a tracking start switch 108 for designating the start of AF frame auto-tracking; and a tracking stop switch 110 for designating stopping of AF frame auto-tracking. The setting states of these operation members 100, 102, 104, 108, and 110 can be read by the image processing unit 58 (a CPU 78 of a main board 70 that is described later).

The LCD 40 of the AF frame operation section 60 is configured to be capable of inputting settings such as modes relating to AF frame auto-tracking by a touch operation (tap operation). The image displayed on the LCD 40 is appropriately changed in accordance with the setting contents by the CPU 78 of the image processing unit 58. The display and operation of the LCD 40 will be described later.

According to the present embodiment, a configuration is described in which the AF frame control device that includes the image processing unit 58 and the AF frame operation section 60 is integrated into the focus demand 26. However, the AF frame control device may be provided as a separate device from the focus demand 26. In this case, a part or all of the AF frame operation section 60 may be provided integrally with the image processing unit 58, or the AF frame operation section 60 may be provided separately from the image processing unit 58.

Next, the configuration and processing contents of the image processing unit 58 will be described.

The image processing unit 58 mainly includes a main board 70, a pattern matching processing calculation board 72, and a face recognition processing calculation board 74. The main board 70, the pattern matching processing calculation board 72, and the face recognition processing calculation board 74 are equipped with CPUs 78, 90, and 92, respectively. The respective boards individually perform calculation processes. In addition, the CPUs 78, 90, and 92 are connected to each other by a bus or a control line in a manner that data can be exchanged with each other and synchronize the calculation processes.

The main board 70 controls the overall processing of the image processing unit 58. In addition to the above-described CPU 78 for performing calculation processing, the main board 70 is also provided with an SCI 70a, a decoder (A/D converter) 76, a superimposer 82, a RAM (Random Access Memory) 80, and the like.

The SCI 70a is, as described above, an interface circuit for performing serial communication with the SCI 12a of the lens device 12, and transmits the above-described AF frame information and the like to the lens device 12.

The decoder 76 is a circuit for converting the video signal (SDTV signal) of the video image captured by the television camera 10, which is input from the down converter 68 to the image processing unit 58, into data which can be digitally processed by the image processing unit 58. The decoder 76 performs an A/D conversion process and the like that converts the analog SDTV signal into a digital video signal. Video signals of captured video images that are output from the decoder 76 are also sent to the pattern matching processing calculation board 72 and the face recognition processing calculation board 74. The captured video images of the television camera 10 can be acquired as captured images in single frame units at the pattern matching processing calculation board 72 and the face recognition processing calculation board 74 also.

The superimposer 82 is a circuit for synthesizing the video signal of the captured video image obtained by the decoder 76 and the image signal generated by the CPU 78 and outputting the synthesized video signal to the LCD 40 to display the synthesized video signal thereon. Thus, the captured video image of the television camera 10 is displayed on the LCD 40 similarly to the view finder 36 provided on the camera main body 14. In addition, an AF frame image indicating the range of the currently set AF frame, a menu screen (menu image) configured to allow an input operation to be performed with the touch panel, and the like are displayed on the LCD 40 so as to be superimposed on the captured video image. Naturally, an image generated at the CPU 78 can also be displayed alone without being superimposed on a captured video image.

The RAM 80 is a memory that temporarily stores data used in the calculation processes of the CPU 78.

The pattern matching processing calculation board 72 and the face recognition processing calculation board 74 are calculation boards for individually performing a pattern matching processing and a face detection and recognition process, and respectively include VRAMs 94 and 96 that temporarily store image data and the like, in addition to the CPUs 90 and 92 that perform the calculation processes.

The image processing unit 58 is provided with a slot 115 for loading a data card 114 as an external memory such as an SD (Secure Digital) card or a USB memory. When detecting the face of a specific person by face recognition, certification data representing the face of the specific person can be previously stored in the data card 114 and, thereafter, when the data card 114 is inserted into the slot 75, the CPU 78 can read the certification data required for the face recognition from the data card 114.

Next, control of the AF frame performed by the image processing unit 58 configured as described above will be described together with the process relating to the display and operation of the LCD 40.

Figure 5:
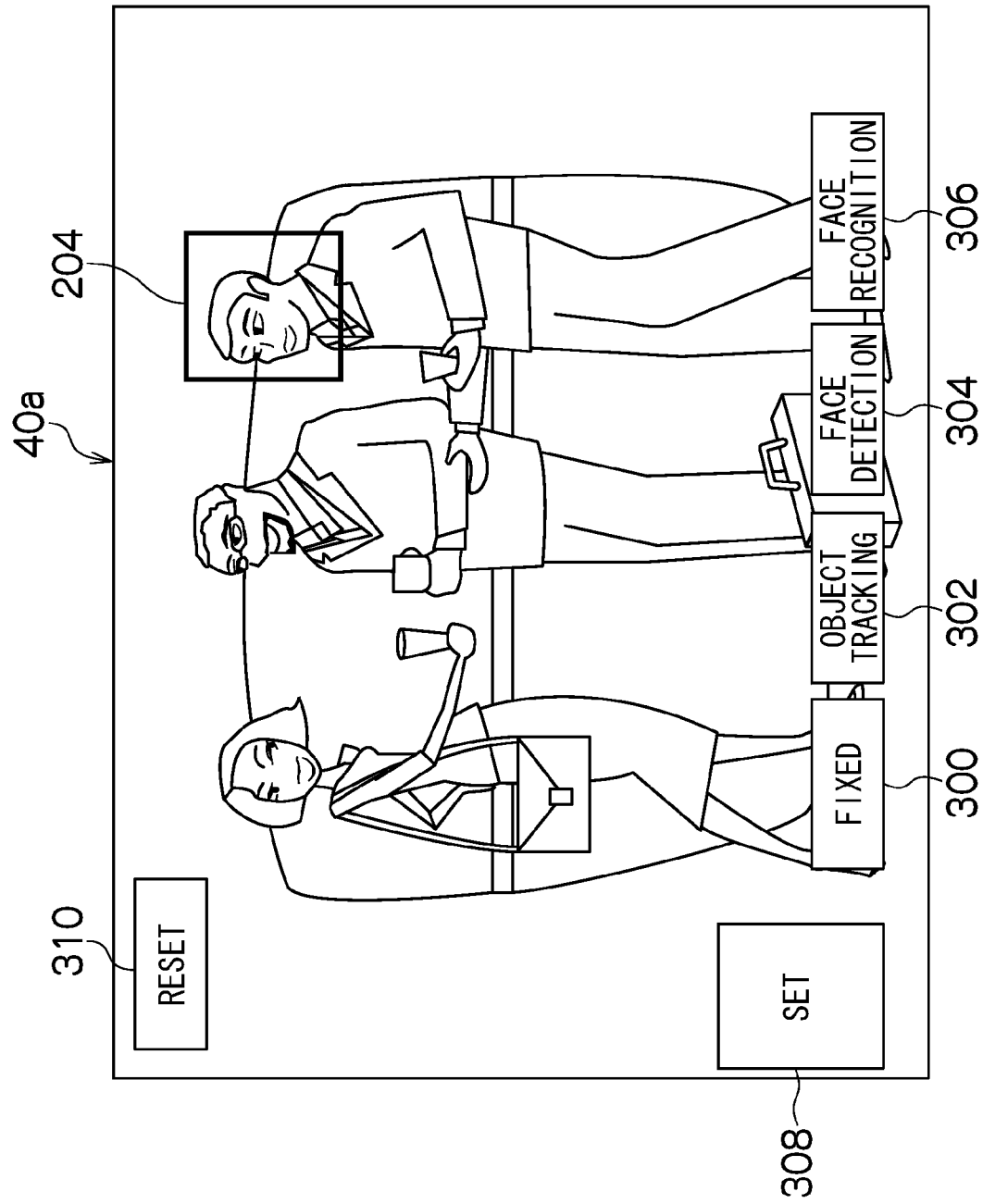
FIG. 5 is a view illustrating an example of a screen displayed on a liquid crystal display equipped with a touch panel.

First, the display and operation of the LCD 40 will be described. As shown in FIG. 5, a menu screen (menu image) including various buttons 300 to 310 and an AF frame image 204 (simply referred to as "AF frame 204") which represents the range of the currently set AF frame are displayed on a screen 40a of the LCD 40 by superimposing the menu screen and the AF frame 204 on the captured video image of the television camera 10. The images that are superimposed on the captured video image, such as the various buttons 300 to 310 of the menu screen and the AF frame 204, are generated by the CPU 78 of the main board 70 in the image processing unit 58 shown in FIG. 2. These images are superimposed, by the superimposer 82, on the captured video image of the television camera 10 obtained from the decoder 76 so as to be displayed on the LCD 40. In this connection, the control relating to the display (display contents) of the LCD 40 is performed by the CPU 78.

The LCD 40 has a touch panel, and when a touch operation is performed, that is, when the tip of a finger or the like comes into contact with the screen 40a of the LCD 40, position information representing the touched position (coordinates) is transmitted to the CPU 78. It is thereby possible for the CPU 78 to detect the position of the touch operation performed on the screen 40a of the LCD 40 as well as the type of operation performed (tap operation, double tap operation or the like). A process in accordance with the relevant operation is then executed by the CPU 78.

Basic operations on the screen 40a of the LCD 40 include an operation for inputting an instruction previously assigned to the respective buttons 300 to 310 and an operation for specifying the range of the AF frame 204. The former operation is a tap operation performed on the position of the relevant button among the buttons 300 to 310 using the tip of a finger or the like. The latter operation for specifying the range of the AF frame 204 is performed, for example, by tapping a position to which it is desired to move the AF frame 204 on the screen 40a of the LCD 40 on which the captured video image is displayed, so that the AF frame 204 can be moved with the tapped position located at the center of the AF frame 204. It is also possible to change the shape or size of the AF frame 204 by a drag operation performed by touching a vertex or side of the AF frame 204 with a the tip of a finger or the like and directly sliding the fingertip over the LCD 40 in that state to thereby move the position of the touched vertex or side to the position to which the tip of a finger moves to.

The menu screen (menu image) displayed on the screen 40a of the LCD 40 will now be described. In FIG. 5, a fixed mode selection button 300 displayed as "fixed", an object tracking mode selection button 302 displayed as "object tracking", a face detection and tracking mode selection button 304 displayed as "face detection", and a face recognition and tracking mode selection button 306 displayed as "face recognition" are buttons for selecting control modes for the AF frame. By performing a tap operation on any one of the buttons 300 to 306, it is possible to select the desired mode among the fixed mode, the object tracking mode, the face detection and tracking mode, and the face recognition and tracking mode. The contents of each mode will be described later.

A set button 308 that is displayed as "set" and a reset button 310 that is displayed as "reset" are buttons for designating starting and stopping of AF frame auto-tracking. These buttons 308 and 310 are displayed only when control modes (object tracking mode, face detection mode) in which an operator designates starting and stopping of AF frame auto-tracking are selected. The set button 308 and the reset button 310 are buttons that have the same function as the tracking start switch 108 and the tracking stop switch 110 (see FIGS. 1 and 4) of the AF frame operation section 60.

The AF frame auto-tracking is started in the following manner. When a double tap operation (an operation of tapping the same position twice in succession) is performed on a desired position on the screen 40a, the AF frame is set at a position that is centered on the double-tapped position and the AF auto-tracking starts. Specifically, the first tap operation of the double tap operation functions as an operation that instructs that the AF frame be moved to the tapped position, and the subsequent second tap operation functions as an operation that instructs the start of the AF auto-tracking. It is thereby possible to omit an operation of instructing the start of AF frame auto-tracking by performing a tap operation on the set button 308. It is therefore possible to promptly input an instruction to set the AF frame position and start the AF frame auto-tracking. In this connection, a configuration may also be adopted in which AF frame auto-tracking can be started by only a double tap operation and the set button 308 is not displayed.

Next, the respective AF frame control modes that can be selected by selecting the fixed mode selection button 300, the object tracking mode selection button 302, the face detection and tracking mode selection button 304, and the face recognition and tracking mode selection button 306 displayed on the screen 40a in FIG. 5 will be described. According to the present embodiment, four modes are available as control modes for the AF frame, namely, a fixed mode, an object tracking mode, a face detection and tracking mode, and a face recognition and tracking mode. These modes can be selected by performing a tap operation on any one of the corresponding selection buttons 300 to 306 as described above.

The fixed mode is a mode (manual mode) that allows an operator to specify the range (position, size, and shape) of the AF frame by means of a manual operation, and to fix the AF frame at the specified position. The fixed mode is a useful mode when imaging in a case in which the camera is scarcely moved, such as when imaging a news program.

The fixed mode is selected when the fixed mode selection button 300 on the screen 40a of the LCD 40 shown in FIG. 5 is tapped, and in response thereto the CPU 78 mounted on the main board 70 of the image processing unit 58 executes the processing of the fixed mode.

Specifically, as described above, the CPU 78 determines the range of the AF frame based on the operation to change the range of the AF frame that is performed on the screen 40a of the LCD 40 and operation of operation members (a position operation member 100, a size operation member 102, and a shape operation member 104) for changing the AF frame 204 by a manual operation that are provided in the AF frame operation section 60. When determining the range of the AF frame, the CPU 78 transmits AF frame information that shows the range of the AF frame through the SCI 70a to the lens CPU of the lens device 12.

The object tracking mode is another of the AF frame auto-tracking modes. In this mode, an arbitrary kind of object is tracked with the AF frame. The object tracking mode is a useful mode when imaging an object other than a person's face, such as when performing relay broadcasting of a horse race or a car race.

The object tracking mode is selected when the object tracking mode selection button 302 on the screen 40a of the LCD 40 shown in FIG. 5 is tapped, and in response thereto the CPU 78 mounted on the main board 70 of the image processing unit 58 starts the processing of the object tracking mode.

Figure 6:
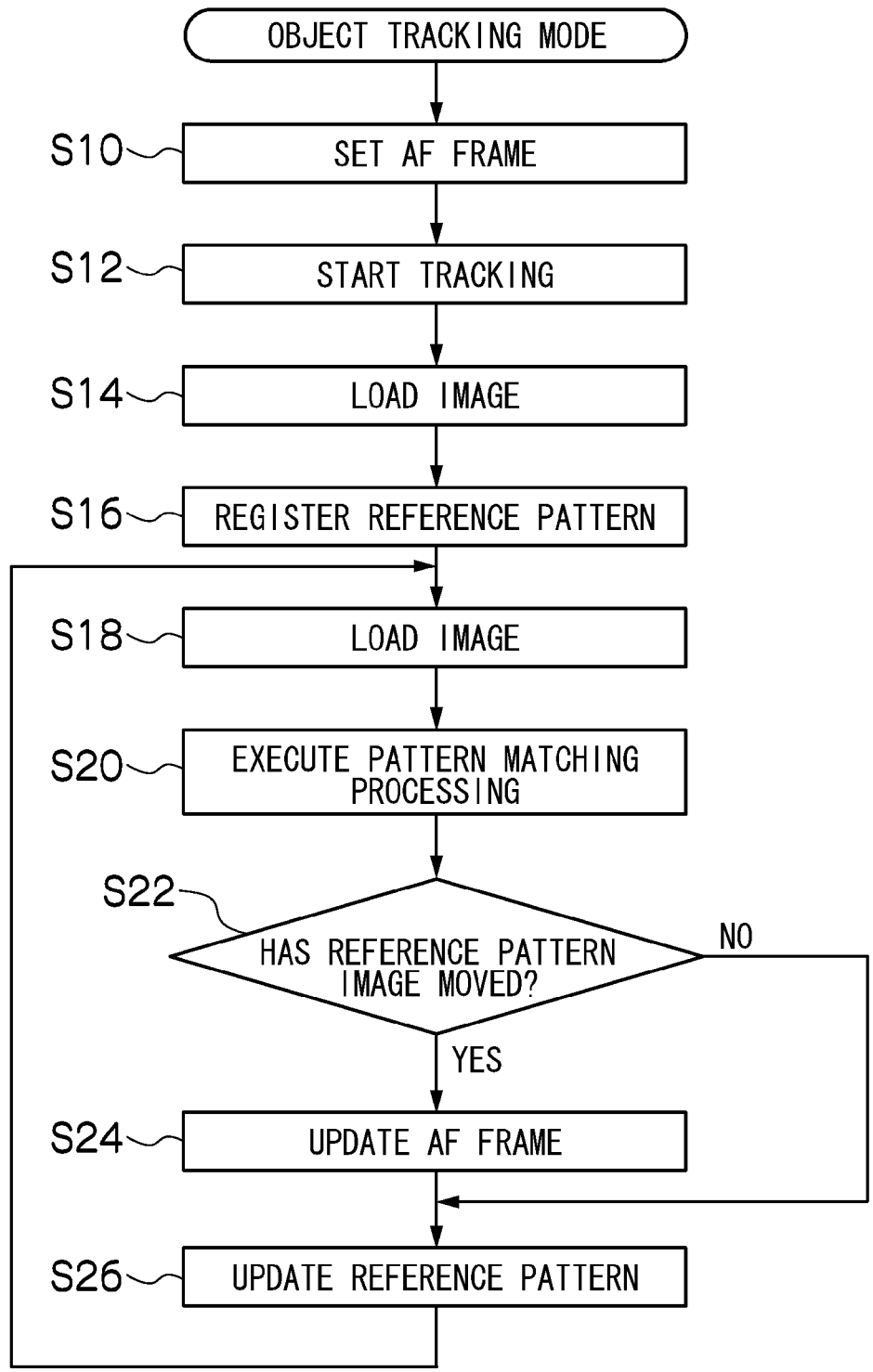
FIG. 6 is a flowchart illustrating a processing procedure of an object tracking mode.

FIG. 6 is a flowchart illustrating the processing procedure of the object tracking mode. Hereunder, the processing of the object tacking mode will be described with reference to the flowchart. When the object tracking mode is selected, the screen 40a of the LCD 40 displays the menu screen shown in FIG. 5.

The CPU 78 of the main board 70 performs processing (initial setting processing of the AF frame) to change the AF frame and set the tracking target in accordance with a manual operation, similarly to the fixed mode, until the operator performs an operation to instruct the start of AF frame auto-tracking at the AF frame operation section 60. That is, the operator specifies the range of the AF frame so that the range includes a subject image as a tracking target (AF target), and in accordance therewith the CPU 78 sets the range of the AF frame (step S10). In this connection, although the AF frame 204 is set on the face of the person in FIG. 5, an object other than the face of a person can be set as a tracking target in the object tracking mode.

Subsequently, when the operator performs an operation to designate the start of AF frame auto-tracking, the CPU 78 (and the CPU 90 of the pattern matching processing calculation board 72) starts the processing for AF frame auto-tracking (steps S14 to S26) based on pattern matching, and also starts processing (transmission of AF frame information) that specifies the range of the AF frame determined by the AF frame auto-tracking processing to the lens CPU of the lens device 12 (step S12).

The operator can input an instruction to start the AF frame auto-tracking by performing a tap operation on the set button 308 or a double tap operation at an arbitrary position (position at which the AF frame is to be set) on the screen 40a of the LCD 40 shown in FIG. 5. An instruction to start AF frame auto-tracking can also be input by pressing the tracking start switch 108 that is provided as a mechanical switch on the AF frame operation section 60. The setting of the AF frame position in step S10 can also be performed when an instruction to start AF frame auto-tracking is input by a double tap operation on the screen 40a of the LCD 40. However, it is also possible to adopt a configuration in which a double tap operation at an arbitrary position is an operation that only instructs the start of the AF frame auto-tracking. In that case, the double tap operation is not related to setting of the AF frame position.

When focus control based on AF is not performed at the start of AF frame auto-tracking (when the AF mode is not activated), the start of AF is also instructed in conjunction with the start of the AF frame auto-tracking.

When the AF frame auto-tracking processing is started, the CPU 90 of the pattern matching processing calculation board 72 loads image data of a captured image corresponding to one screen (one frame) from the decoder 76 in response to an instruction issued by the CPU 78 (step S14). Subsequently, the CPU 90 acquires the range of the currently set AF frame from the CPU 78, and sets (stores) the image that is inside the range of the AF frame in the thus-loaded captured image as a reference pattern image (step S16). The CPU 90 then repeats the processing of steps S18 to S26 described hereunder.

First, the CPU 90 loads image data of the captured image that corresponds to one screen from the decoder 76 (step S18), and detects an image range that matches the reference pattern image in the captured image by performing a pattern matching processing (step S20). The CPU 90 then notifies the detected image range to the CPU 78 of the main board.

The CPU 78 determines whether or not the reference pattern image has moved, that is, whether or not the image range for which the reference pattern has been detected differs from the range of the currently set AF frame (step S22). In this connection, the result "Yes" is also determined in this determination process if the size of the reference pattern image in the captured image has changed.

If "Yes" is determined as the result of the processing in step S22, the image range detected in step S20 is set (updated) as the new range of the AF frame, and AF frame information representing the range of the AF frame is transmitted to the lens CPU of the lens device 12 (step S24).

Further, the CPU 90 of the pattern matching processing calculation board 72 updates the image within the image range detected in step S22 as a new reference pattern image (step S26).

If "No" is determined as the result of the processing in step S22, the AF frame is not updated in step S24, and only updating of the reference pattern in step S26 is performed.

When the processing of step S26 ends, the flow returns to the processing of step S18.

When the operator performs an operation to instruct that the AF frame auto-tracking be stopped, for example, a tap operation on the reset button 310 displayed on the screen 40a of the LCD 40, the processing of the AF frame auto-tracking is stopped and the flow returns to step S10. At this time, the focus control based on AF may also be stopped.

The face detection and tracking mode is one of the modes that perform AF frame auto-tracking. This mode causes the AF frame to track the face of an arbitrary person. The face detection and tracking mode is a useful mode for capturing images in a song broadcast or the like in which the face of a person is detected and tracked. The operator taps on the face detection and tracking mode selection button 304 on the screen 40a of the LCD 40 shown in FIG. 5 to select the face detection and tracking mode. When the face detection and tracking mode is selected, the CPU 78 mounted on the main board 70 of the image processing unit 58 starts the processing in the face detection and tracking mode.

Figure 8:
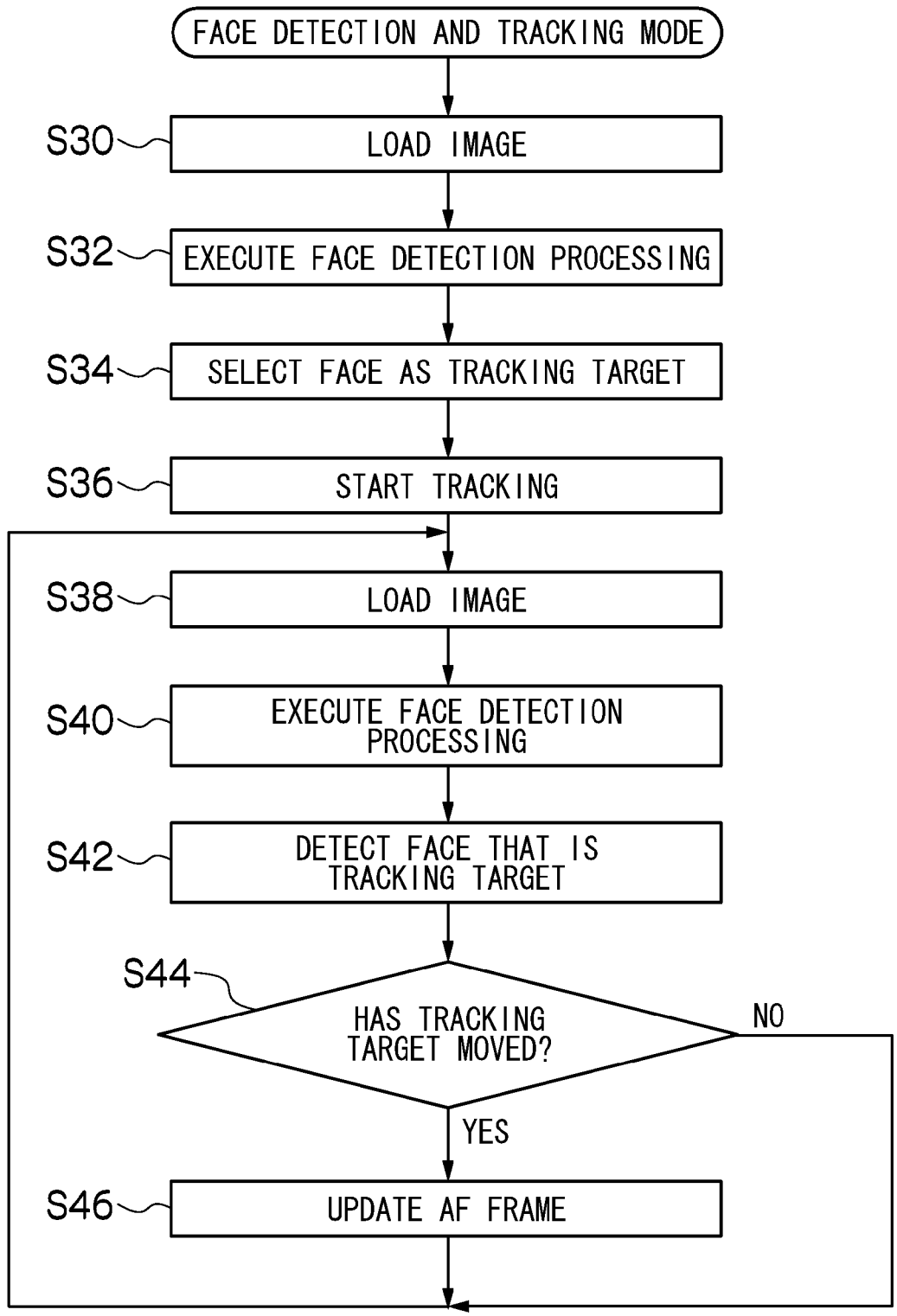
FIG. 8 is a flowchart illustrating a processing procedure of the face detection and tracking mode.

FIG. 8 is a flowchart illustrating the processing procedures of the face detection and tracking mode. Hereunder, the processing of the face detection and tracking mode will be described with reference to the flowchart.

When the face detection and tracking mode is selected, first the CPU 78 of the main board 70 performs processing for setting a face of a tracking target (initial setting processing of the AF frame). More specifically, the CPU 78 instructs a CPU 92 of the face recognition processing calculation board 74 to start face detection processing. As a result, first, the CPU 92 of the face recognition processing calculation board 74 loads image data of a captured image corresponding to one screen from the decoder 76 (step S30). Subsequently, the CPU 92 performs known face detection processing that detects a face (facial image) of an arbitrary person included in the captured image (step S32). The CPU 92 then notifies the range of the detected facial image to the CPU 78 of the main board 70. If facial images of a plurality of people are included in the captured image, the CPU 92 detects the ranges of the plurality of facial images, and notifies the detected ranges to the CPU 78.

Figure 7:
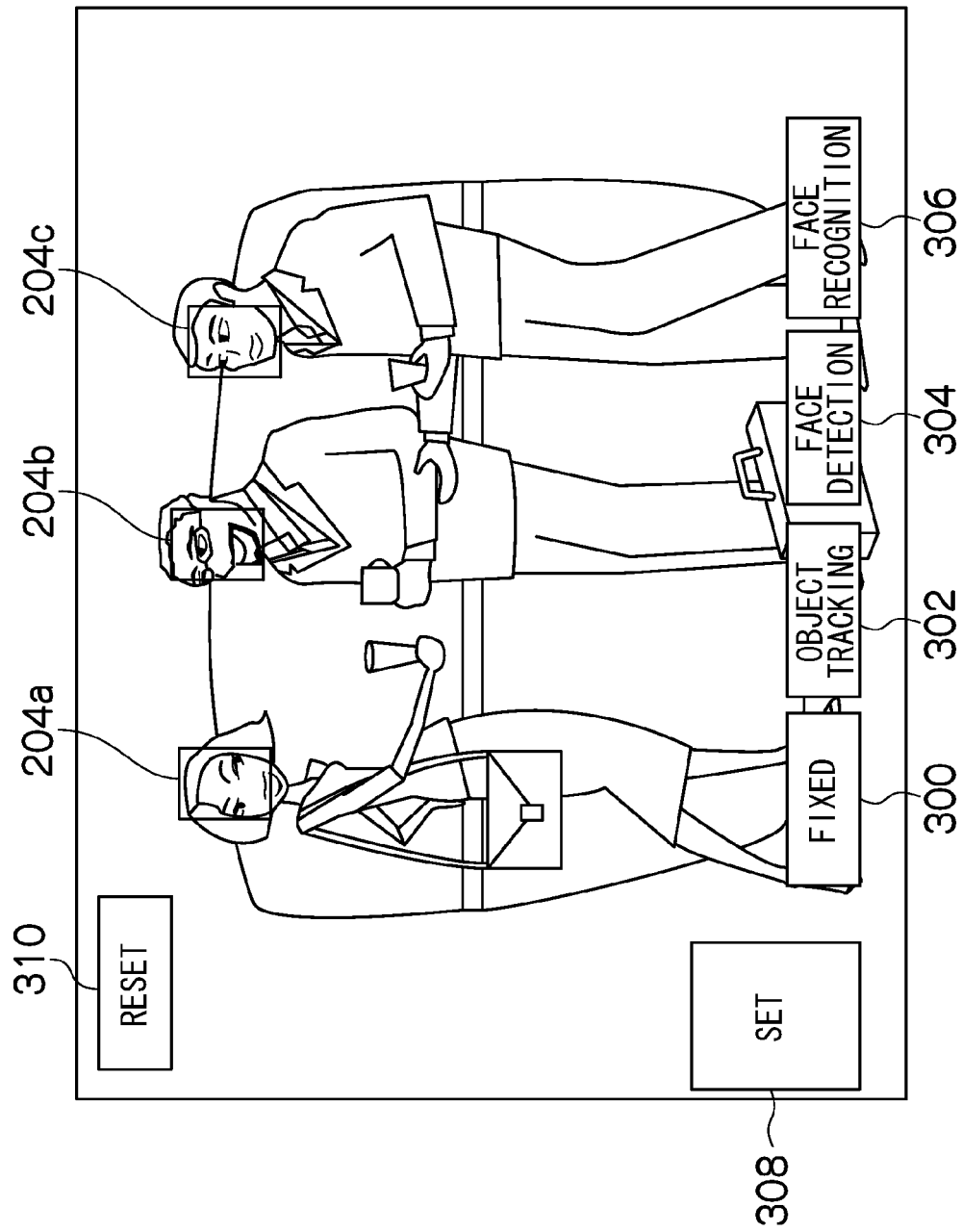
FIG. 7 is a view illustrating an example of a screen displayed on a liquid crystal display equipped with a touch panel in a face detection and tracking mode.

As shown in FIG. 7, the CPU 78 displays the ranges of the detected facial images as face frames 204a, 204b, and 204c on the screen 40a of the LCD 40. Subsequently, when the operator performs a tap operation to select (specify) a face as a tracking target (AF target) among the faces shown by the face frames 204a, 204b, and 204c, the CPU 78 sets the selected face as the tracking target, and sets the face frame of the face which has been set as the tracking target as the AF frame (step S34).

In this connection, the face frames before the AF frame is set are displayed using a different color to that of the AF frame. For example, the face frames may be displayed in green, and the AF frame may be displayed in red. Further, when the CPU 78 has set the face frame selected by the operator as the AF frame, the CPU 78 turns off the display of the face frames on the screen 40a of the LCD 40. If there is only one face frame, the face frame may be automatically set as the AF frame even if the operator does not perform the operation to select the tracking target.

When the operator performs an operation to instruct the start of AF frame auto-tracking after the AF frame has been set by the above processing (initial setting processing of the AF frame) that sets the face that is the tracking target, the CPU 78 (and the CPU 92 of the face recognition processing calculation board 74) starts the AF frame auto-tracking processing (steps S38 to S46) based on the face detection processing, and also starts processing (transmission of AF frame information) that specifies the range of the AF frame determined by the AF frame auto-tracking processing to the lens CPU of the lens device 12 (step S36).

In this case, the operator can instruct the start of AF frame auto-tracking by performing a tap operation on the set button 308 or a double tap operation on the position of the AF frame similarly to when in the object tracking mode. Further, in step S34, when selecting the face frame to be taken as the face of the tracking target (when setting the AF frame), by performing a double tap operation instead of a tap operation on the face frame being selected, the operator can instruct the start of the AF frame auto-tracking at the same time as setting the relevant face frame as the AF frame. A configuration can also be adopted in which a double tap operation at an arbitrary position is an operation that only specifies the start of the AF frame auto-tracking. In that case, the double tap operation performed at an arbitrary position specifies the start of AF frame auto-tracking, irrespective of the setting of the AF frame. Further, a configuration may also be adopted such that the AF frame auto-tracking processing automatically starts when the AF frame has been set in step S34. In this connection, similarly to the object tracking mode, when focus control based on AF is not performed at the start of AF frame auto-tracking (when the AF mode is not activated), the start of the AF is also specified in conjunction with the start of the AF frame auto-tracking.

When the AF frame auto-tracking processing is started, similarly to the processing of steps S30 and S32, the CPU 92 of the face recognition processing calculation board 74 loads the image data of a captured image corresponding to one screen from the decoder 76 in response to an instruction to execute the face detection processing that is issued from the CPU 78 (step S38). In addition, the CPU 92 performs face detection processing that detects the face of an arbitrary person included in the captured image (step S40). The CPU 92 then notifies the range of the detected facial image to the CPU 78 of the main board 70.

The CPU 78 detects a range which is most approximate to the range of the currently set AF frame among the ranges of the detected facial images as the range of the facial image of the tracking target (step S42). In this connection, in step S40, a range in which to detect a face need not be the range of the entire captured image, and may be limited to the vicinity of the position of the currently set AF frame.

Subsequently, the CPU 78 determines whether or not the face that is the tracking target has moved, that is, whether or not the range of the detected facial image differs from the range of the currently set AF frame (step S44). In this connection, the result "Yes" is also determined in this determination process if the size of the facial image has changed.

If the result determined in step S44 is "Yes", the range of the facial image detected in step S42 is set (updated) as the new AF frame range, and AF frame information representing the range of that AF frame is transmitted to the lens CPU of the lens device 12 (step S46). The flow then returns to the processing of step S38. If the result determined in step S44 is "No", updating of the AF frame is not performed in step S46, and the flow returns to the processing of step S38.

In this connection, when the operator performs an operation to instruct that the AF frame auto-tracking be stopped, for example, a tap operation on the reset button 310 displayed on the screen 40a of the LCD 40, the AF frame auto-tracking processing is stopped, and the flow returns to step S30. At this time, the focus control based on AF may also be stopped. The processing of the present flowchart ends the AF frame auto-tracking processing.

In the face detection processing in step S40, a facial image may be not completely detected in the captured image. Furthermore, when detecting the facial image of the tracking target in step S42, a case may arise in which the range of the facial image that is most approximate to the range of the currently set AF frame is clearly not continuous with the range of the current AF frame (the two ranges are separated by an excessive amount or the like). In such case, since tracking is not possible, the processing of the AF frame auto-tracking is stopped and the flow returns to step S30, similarly to the above situation when the operator inputs an instruction to stop the AF frame auto-tracking.

The face recognition and tracking mode is another mode that performs AF frame auto-tracking. This mode causes the AF frame to track the face of a person previously registered as certification data. The face recognition and tracking mode is a useful mode for capturing images in a song broadcast or a sports broadcast in which the person to be imaged is previously determined.

Figure 9:
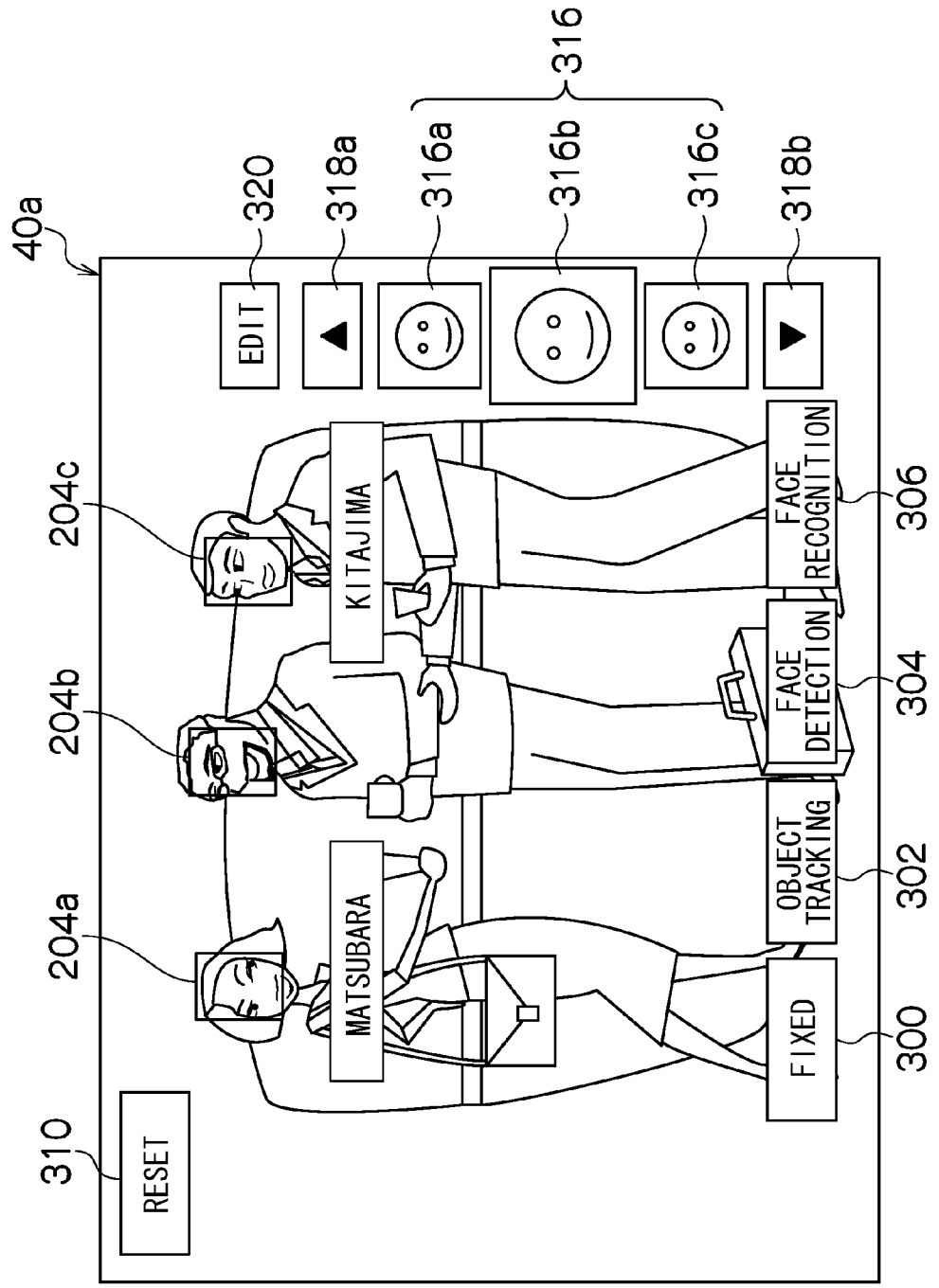
FIG. 9 is a view illustrating an example of a screen displayed on a liquid crystal display equipped with a touch panel in a face recognition and tracking mode.

When the operator taps the face recognition and tracking mode selection button 306 on the screen 40a of the LCD 40 shown in FIG. 5 to select the face recognition and tracking mode, the CPU 78 mounted on the main board 70 of the image processing unit 58 starts the processing of the face recognition and tracking mode. When the face recognition and tracking mode is selected, the screen 40a of the LCD 40 changes as shown in FIG. 9 and, as described later, a registered facial image display section 316 (316a to 316c) that relates to face recognition, selection buttons 318a and 318b, and an edit button 320 are displayed. Further, since AF frame auto-tracking is automatically started when a face that is to be taken as the tracking target (face of tracking target subject) is set from among faces that are previously registered as certification data, as described later, is detected, the set button 308 shown in FIG. 5 is also not displayed.

FIG. 10 is a flowchart illustrating a processing procedure of the face recognition and tracking mode. Hereunder, the processing of the face recognition and tracking mode will be described with reference to this flowchart.

When the face recognition and tracking mode is selected, first, the CPU 78 of the main board 70 performs processing (initial setting processing of the AF frame) for setting a face of a tracking target (face of tracking target subject) (step S50). More specifically, certification data on the face of a single person or a plurality of people as tracking target candidates is registered in the data card 114 inserted into the slot 115 shown in FIG. 2, and the CPU 78 reads the certification data from the data card 114. The certification data, for example, includes a plurality of kinds of data regarding the relevant person's features such as the person's face as seen from different light directions, different facial images when the face is viewed from the front, the left side, or the right side and the like, a distance between the two eyes, a distance between the eyes and the nose, and the ratios between these distances and the like. The CPU 78 then displays the facial images of the people registered as certification data on the registered facial image display section 316 (316a to 316c) as shown in FIG. 9. The operator selects a facial image as the tracking target from the facial images being displayed on the registered facial image display section 316 by performing a tap operation on the selection buttons 318a or 318b. Each time the upper selection button 318a is tapped, the selected facial image changes to the facial image that is positioned immediately above the currently selected facial image in the registered facial image display section 316. Each time the lower selection button 318b is tapped, the selected facial image changes to the facial image that is positioned immediately below the currently selected facial image. Further, the facial image that is currently selected in the registered facial image display section 316 is enlarged more than the other facial images (see 316b). In this connection, the manner of displaying the registered facial image display section 316 and the method of selecting a tracking target is not limited to the above-described manner and method.

Thus, when the operator selects a face as the tracking target from among the faces registered as the certification data, the CPU 78 sets the selected face as the face of the tracking target (tracking target subject).

Furthermore, by performing a tap operation on the edit button 320, it is possible to edit the order of the facial images displayed on the registered facial image display sections 316. Therefore, for example, when the faces of a plurality of people registered as certification data are set as tracking targets in a predetermined order, by previously setting the order of the facial images that are displayed on the registered facial image display section 316 in accordance with that predetermined order, the faces of the tracking targets can be changed in the predetermined order by performing a single tap operation on the selection button 318a or 318b.

When the face of the tracking target subject is set, the CPU 78 starts the processing for AF frame auto-tracking (steps S54 to S78), and also starts processing to specify the range of the AF frame determined by this processing for AF frame auto-tracking to the lens CPU of the lens device 12 (transmits AF frame information) (step S52).

First, the CPU 78 instructs the CPU 92 of the face recognition processing calculation board 74 to start face recognition processing. Upon receiving the instruction to start face recognition processing, the CPU 92 of the face recognition processing calculation board 74 loads the image data of a captured image corresponding to one screen from the decoder 76 (step S54), and detects an arbitrary face (facial image) included in the captured image by face detection processing, similarly to the detection of the face detection and tracking mode. Subsequently, the CPU 92 acquires certification data from the CPU 78 of the main board 70, and executes face recognition processing that uses the certification data to determine whether or not the facial image detected by the face detection processing is the facial image of a specific person that is previously registered as certification data (step S56). In this connection, the face detection processing performed in the present face recognition and tracking mode is taken as being one part of the face recognition processing.

When the face recognition processing ends, the CPU 92 notifies the result of the processing to the CPU 78 of the main board 70. Thus, the CPU 78 acquires the range of the relevant facial image in a case where the face of a specific person that is registered as certification data has been detected, or acquires the range of the relevant facial image in a case where the face of a person that is not registered as certification data has been detected.

Next, the CPU 78 determines whether or not the face of the tracking target subject set in step S50 has been detected (step S58). If the result determined in step S58 is "No", the flow returns to the processing of step S54 to repeat the above-described processing. More specifically, the face recognition processing from step S54 to step S58 is repeated until the face of the tracking target is detected in the captured image by the face recognition processing of step S56.

In contrast, if the result determined in step S58 is "Yes", more specifically, if the face of the tracking target subject is detected in the captured image, the range of the facial image is set as the range of the AF frame (initial setting processing of the AF frame). The CPU 78 then changes to the object tracking processing (step S60 to step S72). More specifically, the CPU 78 shifts to execution of processing that is the same as the processing for object tracking (step S16 to step S26 in FIG. 6) in the object tracking mode.

In this case, the face recognition processing of step S54 to step S58 may also be repeated after detecting the face of the tracking target subject in step S58, and the face of the tracking target subject can be tracked by taking the range of the facial image of the tracking target subject that is detected by the face recognition processing as the range of the AF frame. However, since the processing time for face recognition processing is long and requires an amount of time in which captured images of a plurality of screens are imaged by the television camera 10 (camera main body 14), there will be a delay in the tracking. Therefore, according to the face recognition and tracking mode of the present embodiment, after detecting the face of the tracking target subject by face recognition processing when starting the AF frame auto-tracking, the face of the tracking target subject is tracked by object tracking processing which enables high-speed processing.

In step S54, the CPU 90 of the pattern matching processing calculation board 72 together with the CPU 92 of the face recognition processing calculation board 74 loads image data for a captured image of one screen from the decoder 76, and when the CPU 78 shifts to object tracking processing the CPU 90 acquires the range of the currently set AF frame from the CPU 78, and sets (stores) the image within the range of the AF frame in the loaded captured image as a reference pattern image (step S60). The processing of steps S62 to S72 described hereunder is then repeatedly executed.

First, the CPU 90 loads image data of a captured image corresponding to one screen from the decoder 76 (step S62), and detects the image range that matches the reference pattern image in the captured image by performing pattern matching processing (step S64). The CPU 90 then notifies the detected image range (or the fact that an image matching the reference pattern has not been detected) to the CPU 78 of the main board.

Although omitted from the processing illustrated in the flowchart shown in FIG. 6 for the object tracking mode, based on the notification from the CPU 90, the CPU 78 determines whether or not an image matching the reference pattern has been detected (whether or not the images matched) (step S66). When the result determined in step S66 is "No", since the state is one in which the device has lost track of the face of the tracking target subject, the CPU 78 returns to step S54 to begin the face recognition processing again.

In contrast, when the result determined in step S66 is "Yes", the CPU 78 determines whether or not the reference pattern image has moved. That is, the CPU 78 determines whether or not the image range in which the reference pattern has been detected differs from the range of the currently set AF frame (step S68). In this connection, "Yes" is also determined as the result of this processing when the size of the reference pattern image has changed in the captured image.

If the result determined in step S68 is "Yes", the image range detected in step S64 is set (updated) as the new range of the AF frame, and AF frame information representing the range of this AF frame is transmitted to the lens CPU of the lens device 12 (step S70).

Further, the CPU 90 of the pattern matching processing calculation board 72 updates the image within the image range detected in step S64 as a new reference pattern image (step S72).

If "No" is determined as the result of the processing in step S68, the AF frame is not updated in step S70, and only updating of the reference pattern in step S72 is performed.

When the processing in step S72 ends, the CPU 78 increments by 1 a parameter N that has an initial value of 0 (N=N+1) (step S74), and determines whether or not the parameter N is 4 or whether or not the operator has performed an operation to change the face to be taken as tracking target (step S76). That is, the CPU 78 determines whether or not either one of the conditions that N=4 or an operation has been performed to change the face to be taken as the tracking target has been established.

If the result determined in step S76 is "No", the CPU 78 returns to step S62 to repeat the object tracking processing of step S62 to step S72.

In contrast, if the result determined in step S76 is "Yes", after resetting N to 0 (step S78), the CPU 78 returns to step S54 to begin the processing again from the face recognition processing in step S54 to step S58.

Figure 11A:
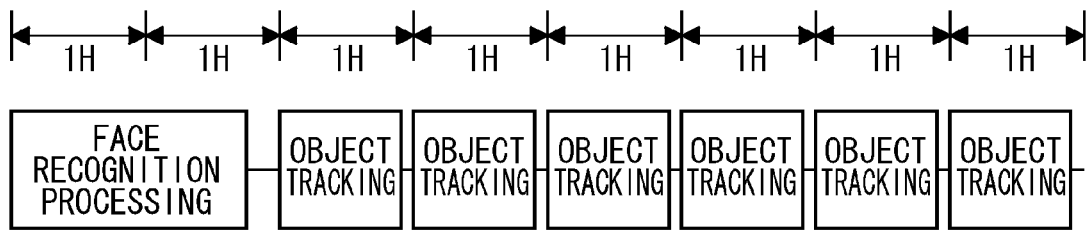
FIGS. 11A and 11B are explanatory drawings that illustrate execution patterns of face recognition processing and object tracking processing in a face recognition and tracking mode.
Figure 11B:
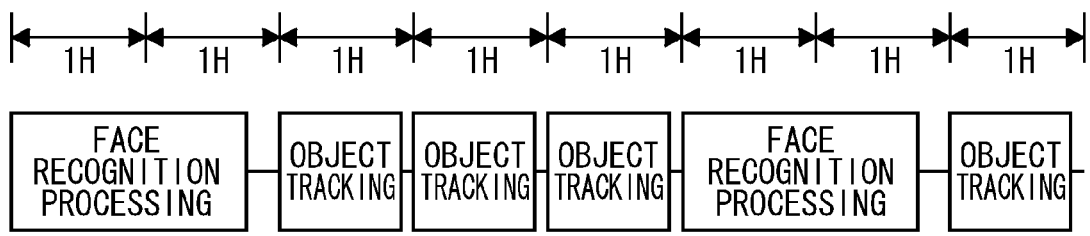

Therefore, when the operator does not perform an operation to change the face to be taken as the tracking target, the face recognition processing of step S54 to step S58 is executed once for every three times that the object tracking processing of step S62 to step S72 is executed. FIG. 11A is a view illustrating the execution pattern of face recognition processing and object tracking processing in a conventional face recognition and tracking mode. FIG. 11B is a view illustrating the execution pattern of face recognition processing and object tracking processing in the face recognition and tracking mode according to the present embodiment. When a period (time) in which a captured image of one screen (one frame) of a video signal of a video image captured by the television camera 10 is defined as "1H", although a time 2H (greater than 1H and less than 2H) that is equivalent to the time of two screens is required for one round of face recognition processing, one round of object tracking processing is completed in a time 1H (less than 1H) that is equivalent to the time of one screen. As shown in FIG. 11A, conventionally, after face recognition processing is executed once when starting AF frame auto-tracking, object tracking processing is then continually executed repeatedly until an instruction is received to stop the AF frame auto-tracking (for example, until a tap operation is performed on the reset button 310 on the screen 40a shown in FIG. 9). In contrast, according to the present embodiment, as shown in FIG. 11B, after executing face recognition processing once when starting AF frame auto-tracking, object tracking processing is repeated three times. Thereafter, face recognition processing is executed once more. That is, face recognition processing is executed once each time object tracking processing is repeated three times, and in this way face recognition processing is performed at predetermined time intervals.

Accordingly, when object tracking processing is being performed, even in a case in which the tracking target has mistakenly changed from the face of the tracking target subject to the face of a different person, such as when the face of the tracking target subject and another face cross with each other, the face of the true tracking target subject is set as the tracking target again by the face recognition processing being executed. In this connection, a configuration may also be adopted in which the face recognition processing is performed each time the object tracking processing has been executed a different number of times than three times.

Further, according to the face recognition and tracking mode of the present embodiment, when the face of a certain person is being tracked as the face of the tracking target, it is possible to switch the face to be taken as the tracking target to the face of another person. More specifically, when the face of a certain person is being tracked as the face of the tracking target, the operator can perform a tap operation on the selection button 318a or 318b to select the face of a person that the operator wants to set as the new tracking target from among the facial images being displayed on the registered facial image display section 316 that is displayed on the screen 40a of the LCD 40 shown in FIG. 9. Thereafter, the facial image of the person that is newly selected is set as the face of the tracking target by the face recognition processing that is performed as appropriate during the object tracking processing. In particular, according to the present embodiment, when this kind of operation that changes the tracking target is performed, the result "Yes" is determined in step S76 and face recognition processing is immediately performed to thereby change the tracking target. However, even if a condition regarding whether or not an operation has been performed to change the face of the tracking target is not included as a determination condition in step S76, when the operator selects the face of a new tracking target, the tracking target will be changed to the newly selected tracking target face by the face recognition processing that is performed after the object tracking processing has been performed three times. Therefore, the determination processing in step S76 may be only processing that determines whether or not N=4.

Furthermore, since the face recognition processing is performed as appropriate, the CPU 78 can recognize the range of faces present in a captured image as shown in screen 40a in FIG. 9, that is, faces that are previously registered as certification data and faces that are not registered as certification data, and the ranges of those recognized faces are displayed on the screen 40a as shown by the face frames 204a, 204b, and 204c on the screen 40a. Subsequently, when the operator selects the face of a person to be taken as a new tracking target, the operator does not make the selection by using the registered facial image display section 316, but instead performs a tap operation inside the face frame of the face that the operator wants to select among the faces for which a face frame is displayed. Thereupon, the face inside the face frame on which the operator performs the tap operation is set as the face of the new tracking target. At this time, not only a face that has been previously registered as certification data, but also a face that has not been registered as certification data can be selected as the face of the new tracking target. In this connection, the method of selecting the face of a tracking target by directly tapping on a face frame can also be employed as the selection method when initially selecting the face of a tracking target when starting the AF frame auto-tracking. A configuration may also be adopted such that the face of a tracking target can be selected by only one of the above-described two methods, namely, the method of selecting the face of a tracking target by directly tapping on a face frame and the method of selecting a face from faces displayed in the registered facial image display section 316 (method of selecting a face by performing a tap operation on the selection button 318a or 318b). However, for example, when there is a small number of faces for which certification data is previously registered and there is a large number of faces included inside a captured image, the method that selects the face of the tracking target from the faces displayed in the registered facial image display section 316 facilitates selection of the face of the desired person. In contrast, in the opposite case, the method that selects the face of the tracking target by performing a tap operation directly on the face frame facilitates selection of the face of the desired person. Hence, a configuration that allows selection by both methods is preferable.

Although a case is described above in which the face recognition and tracking mode of the above embodiment utilizes processing of the object tracking mode, and pattern matching processing is performed as the object tracking processing, a method other than pattern matching processing may also be used as the object tracking processing. More specifically, it is sufficient that the processing can detect the image range of an arbitrary object that is taken as a tracking target from inside a captured image, even if the processing is not pattern matching processing.

What is claimed is:
1. An autofocus (AF) system, comprising:
an autofocus device which controls focusing of an imaging optical system that forms a subject image on an imaging device so as to bring into focus a subject inside an AF area corresponding to position, size, and shape of an AF frame in a range of the subject that is imaged by the imaging device;
a face recognition processing device which uses certification data showing features of a face of a specific person that is previously stored to detect an image of the face of the specific person in a captured image obtained by the imaging device;
an object tracking device which sequentially detects a range of an image that matches an image of an arbitrary object within captured images that are sequentially obtained by the imaging device, and tracks the image of the object by means of an AF frame by setting the range as the AF area; and a face recognition and tracking device that updates the AF area, which is set by the face recognition processing device, at predetermined time intervals after setting the range of the image of the face of the specific person detected by the face recognition processing device as the AF area, while the object tracking device tracks an image in the set AF area as the image of the arbitrary object with the AF frame;

wherein setting of the AF frame by the face recognition processing device is repeatedly performed every predetermined time interval and tracking of the object by the AF frame is performed multiple times during the predetermined time interval following an initial setting of the AF frame and prior to a subsequent setting of the AF frame.

2. The autofocus system according to claim 1, further comprising an operation section which includes a display device for displaying captured images sequentially obtained by the imaging device, and a user input operation device which detects a user operation, wherein while the face recognition and tracking device is tracking the image of the face of the specific person with the AF frame, if it is detected by the face recognition processing device that a face of another person that is different from the specific person is designated on the operation section, the face recognition and tracking device sets the designated image of the face of the another person as the image to be detected by the face recognition processing device, and tracks the designated image of the face of the another person with the AF frame.

3. The autofocus system according to claim 1, wherein the tracking of the object by the AF frame is performed at least three times during the predetermined time interval.

* * * * *